(12) United States Patent
Nishikawa et al.

(10) Patent No.: US 6,601,877 B2
(45) Date of Patent: Aug. 5, 2003

(54) PIPING STRUCTURE OF A WORKING MACHINE

(75) Inventors: Hiroyasu Nishikawa, Tokyo (JP); Takahiro Iwamoto, Tokyo (JP); Toshiyuki Matsumoto, Osaka (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 09/973,052

(22) Filed: Oct. 10, 2001

(65) Prior Publication Data

US 2002/0021958 A1 Feb. 21, 2002

Related U.S. Application Data

(63) Continuation of application No. PCT/JP00/06649, filed on Sep. 27, 2000.

(30) Foreign Application Priority Data

Mar. 30, 2000 (JP) .......................................... 2000-94628

(51) Int. Cl.[7] ................................................. F16L 3/00
(52) U.S. Cl. ........................ 285/62; 285/223; 285/114; 248/75
(58) Field of Search ................................. 285/224, 223, 285/238, 239, 240, 184, 283, 114, 118, 62; 248/75; 37/411, 264

(56) References Cited

U.S. PATENT DOCUMENTS

| | | | | |
|---|---|---|---|---|
| 1,691,816 A | * | 11/1928 | Klyce ............................ | 285/302 |
| 1,853,207 A | * | 4/1932 | Gold et al. ..................... | 285/147.2 |
| 2,575,521 A | * | 11/1951 | Ireland .......................... | 285/223 X |
| 2,626,552 A | * | 1/1953 | Oehler et al. .................. | 248/75 X |
| 2,717,136 A | * | 9/1955 | Greeson ........................ | 248/75 |
| 2,748,236 A | * | 5/1956 | Landis et al. .................. | 248/75 X |
| 2,814,507 A | * | 11/1957 | Lattimore ...................... | 285/114 X |
| 2,861,527 A | * | 11/1958 | Phillips ......................... | 285/238 X |
| 2,879,020 A | * | 3/1959 | Wheeler ....................... | 285/114 X |
| 3,042,223 A | * | 7/1962 | Austgen ........................ | 285/114 X |
| 3,722,916 A | * | 3/1973 | Muntjanoff ..................... | 248/75 X |
| 3,901,270 A | * | 8/1975 | Smith ........................... | 248/75 X |
| 3,970,103 A | * | 7/1976 | McKee, deceased .......... | 285/302 |
| 3,999,784 A | * | 12/1976 | Kennedy, Jr. .................. | 285/62 |
| 4,123,092 A | * | 10/1978 | Colbert, Jr. .................... | 285/302 |
| 4,158,462 A | * | 6/1979 | Coral ............................. | 285/184 X |
| 4,572,302 A | * | 2/1986 | Frisbee ......................... | 248/75 X |
| 4,989,903 A | * | 2/1991 | McAllister ..................... | 285/114 |
| 5,482,505 A | * | 1/1996 | Hedlund ....................... | 285/302 |
| 6,095,181 A | * | 8/2000 | Irwin ............................ | 248/75 X |
| 6,315,500 B1 | * | 11/2001 | Goodman et al. .............. | 37/443 |

FOREIGN PATENT DOCUMENTS

| | | |
|---|---|---|
| JP | 8-158404 U | 1/1979 |
| JP | 5-14250 U | 2/1993 |
| JP | 9-144956 A | 6/1997 |

OTHER PUBLICATIONS

English Abstract of JP 5–14250 U.
English Abstract of JP 9–144956 A.
English Abstract of JP 8–158404 U.

* cited by examiner

*Primary Examiner*—Lynne H. Browne
*Assistant Examiner*—David E. Bochna
(74) *Attorney, Agent, or Firm*—Millen White Zelano & Branigan

(57) ABSTRACT

A piping structure of a working machine, which prevents damage to the hoses that are so arranged as can be flexibly bent on the working machine. The piping structure of a working machine comprises a guide cylinder in which is slidably inserted an intermediate portion of hose to define the bending position of the hose.

11 Claims, 7 Drawing Sheets

PIPING STRUCTURE OF A WORKING MACHINE

CROSS REFERENCE TO RELATED APPLICATION

This application is a continuation of International Application PCT/JP00/06649, filed Sep. 27, 2000, designating the United States, priority of which is claimed under 35 U.S.C. §120.

TECHNICAL FIELD

The present invention relates to a piping structure of a working machine. More specifically, the invention relates to a piping structure of a working machine, that can define the bending positions of hoses arranged so as to be flexibly bent on the working machine.

BACKGROUND ART

Referring to FIG. 8, a working device 52 equipped with, for example, a quick coupler 51, is swingably attached to an end of an arm 50 of a hydraulic shovel which is a typical working machine, by a shaft member 54. By a swing operation link 53 provided for the arm 50, the working device 52 swings between a lower position represented by a solid line and an upper position represented by a two-dot chain line. The working device 52 is provided with a hydraulic cylinder 51a, to which a hydraulic piping 56 from the arm 50 is coupled. A flexible hydraulic hose 56a is used as the hydraulic piping 56 at an end of the arm 50 so as to be able to follow the swinging working of the working device 52. The hydraulic hose 56a is connected at its one end to a piping 56b secured to the arm 50 and is connected at the other end to the hydraulic cylinder 51a. The hydraulic cylinder 51a is of the double-acting type, and a total of two pipings 56 are provided, one being connected to a head end and the other one being connected to a rod end of the hydraulic cylinder 51a.

DISCLOSURE OF THE INVENTION

The piping structure of the conventional working machine of above-mentioned construction, however, involves problems as described below.

That is, when the working device 52 swings at an end of the working arm 50, the hose 56a bends between a "stretched state (indicated by a solid line)" in which both ends thereof are separated away from each other and a "slackened state (indicated by a two-dot chain line)" in which both ends thereof are brought close to each other due to the swinging motion, and is liable to come to contact with the working arm 50 or the working device 52. In the "slackened state", in particular, the hose 56a hangs down between the working arm 50 and the working device 52 or extends over a lateral side of the working arm 50, often being caught between the working arm 50 and the working device 52 or coming in contact with the surrounding obstacles during the work. Consequently, the life of the hose is shortened or the hose is damaged.

The present invention has been accomplished in view of the above-mentioned fact, and its technical assignment is to provide a piping structure of a working machine which makes it possible to prevent the hoses that are so arranged as can be flexibly bent on the working machine, from being damaged.

In the present invention, as a piping structure of a working machine to solve the above-mentioned technical assignment, there is provided a piping structure of a working machine, comprising a guide cylinder in which is slidably inserted an intermediate portion of a hose that is so arranged as can be flexibly bent on the working machine, to define the bending position of the hose.

In the piping structure according to the present invention, the "slacking" of the hose is located at a position where the hose is hardly damaged by using the guide cylinder in which the intermediate portion of the hose is inserted.

In a preferred embodiment, the guide cylinder has, at the end on one side or at the ends on both sides thereof, a bending portion for defining the direction of the hose that moves in or out.

The direction of the hose is determined by the bending portion.

According to another embodiment, a guide member is provided near the open end of the guide cylinder to define the direction of the hose that moves in or out.

The direction of the hose is determined by the guide member.

In a preferred embodiment, provision is made of an urging means for urging the hose toward either a direction to move in to the guide cylinder or a direction to move out from the guide cylinder. The urging means is provided with a tension spring coupled to the hose. According to another embodiment, the urging means is provided with a coil spring in which the hose is inserted. Further, the guide cylinder is formed of a steel pipe.

The urging means urges the hose to move in into, or move out from, the guide cylinder, so that the hose smoothly moves in into, or moves out from, the guide cylinder. Further, the guide cylinder is formed of a steel pipe to protect the hose from damage caused by the interference with foreign matters.

In a preferred embodiment, the working machine includes an arm and a working device swingably coupled to an end of the arm, the guide cylinders are provided on the arm, and hoses are passed into the guide cylinders to connect the arm with the working device.

This prevents the hoses arranged between the arm and the working device of the working machine from being damaged.

BRIEF DESCRIPTION OF THE DRAWINGS

FIG. 1 is viewed in a direction of an arrow A—A (an urging means is not shown);

FIG. 5 is viewed in a direction of an arrow B—B;

BEST MODE FOR CARRYING OUT THE INVENTION

Preferred embodiments of a piping structure of a working machine constituted according to the present invention will now be described in further detail with reference to the accompanying drawings.

Figure 1:
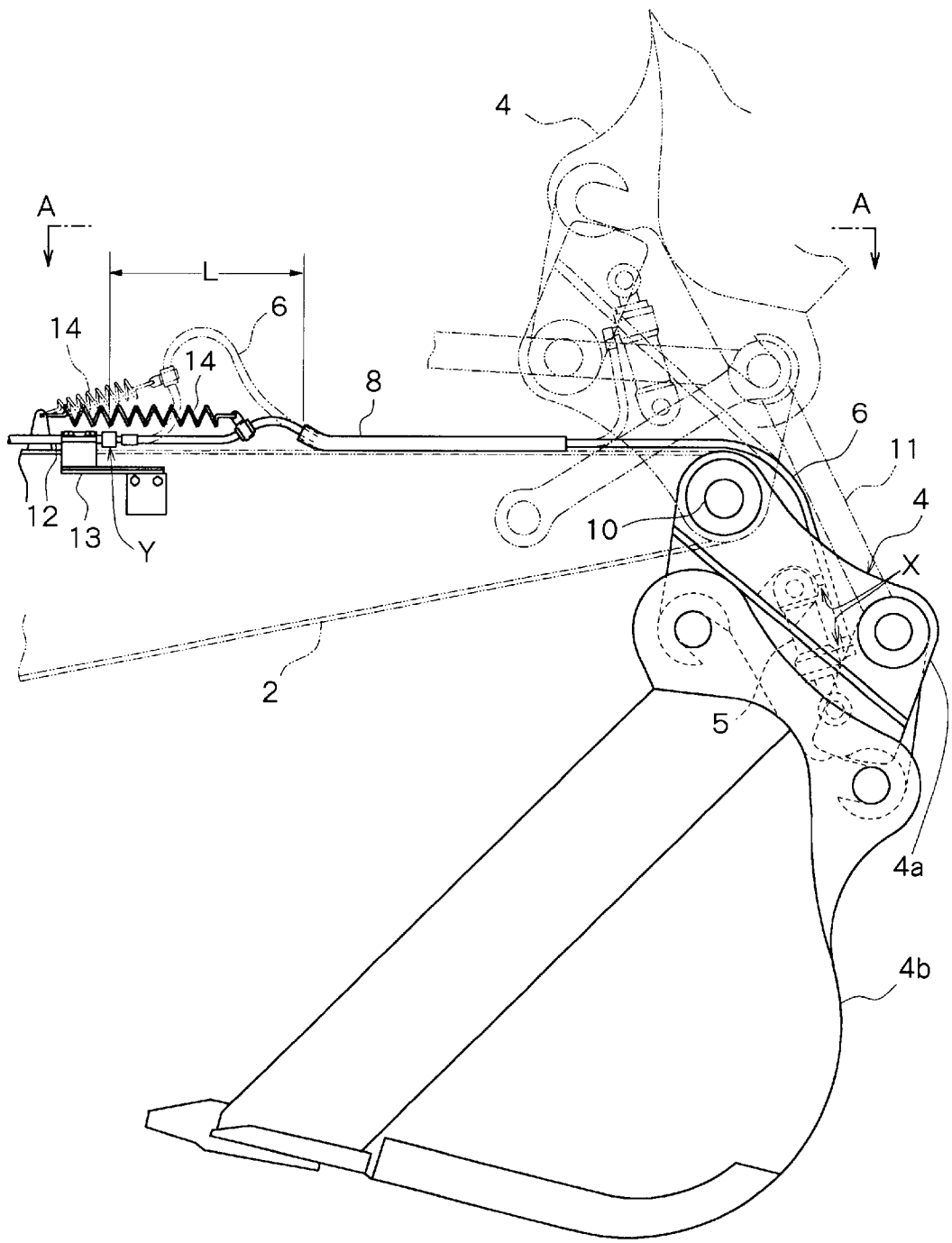
FIG. 1 is a side view of an arm and a working device in a working machine equipped with a piping structure constituted according to the present invention.
Figure 2:
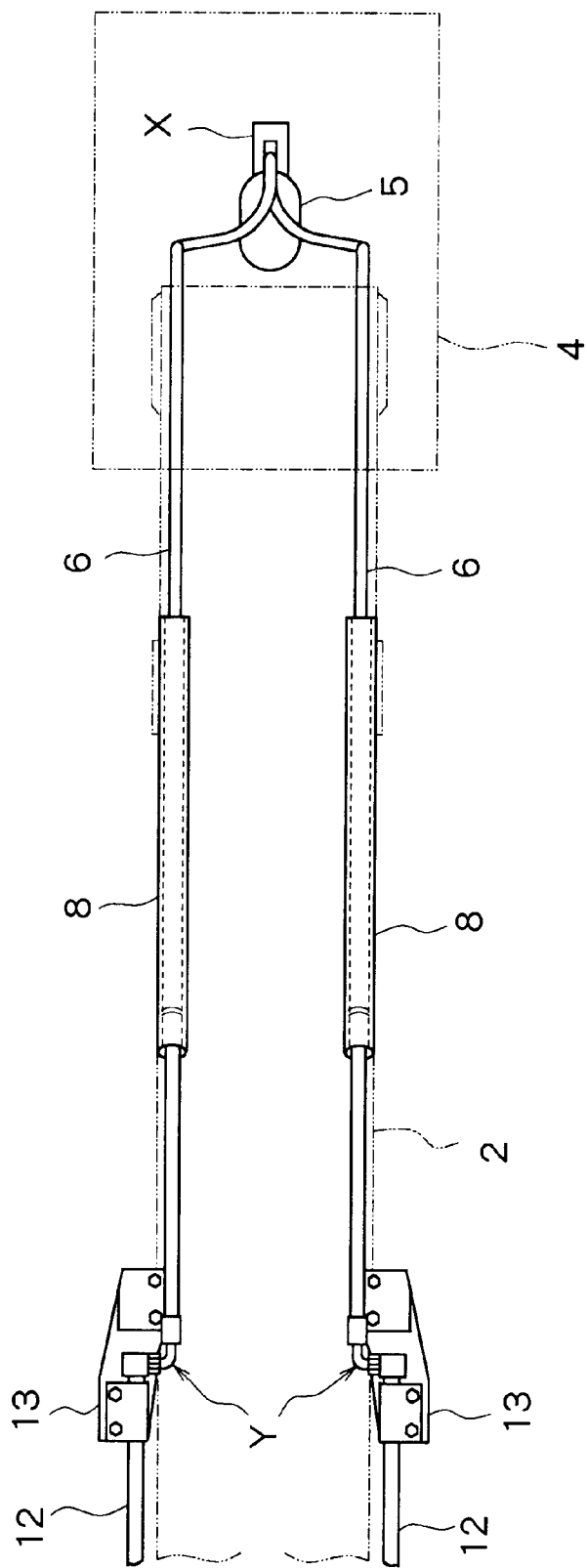
FIG. 2 is a plan view of the piping structure when

Referring to FIGS. 1 and 2, an outline of the invention will be, first, described. A hydraulic shovel which is a typical working machine includes an arm 2 and a working device 4 swingably attached to an end of the arm 2. Hydraulic hoses 6 serving as pipings for fluid are provided between the arm 2 and the working device 4. The arm 2 is provided with guide cylinders 8 in which intermediate portions of the hoses 6 are slidably inserted so as to move in therein or move out therefrom depending upon the swinging motion of the working device 4.

A bucket device 4b having a quick coupler 4a, which is a working device 4, is attached to an end of the arm 2 via a shaft member 10 and swings between a lower position (indicated by a solid line) and an upper position (indicated by a two-dot chain line) shown in FIG. 1 by a swing operation link 11 provided for the arm 2 on the shaft member 10 as a center.

The working device 4 is equipped with a hydraulic cylinder 5 of the double-acting type which is a hydraulic pressure actuator. Therefore, a pair of hoses 6, i.e., a total of two hoses 6 are provided between the arm 2 and the working device 4, the ends X thereof on the side of the working device being connected to a rod end and to a head end of the hydraulic cylinder 5, respectively.

A pair of pipings 12,12 formed of steel pipes extend from the main body of the working machine onto the upper surface of the arm 2, and each of the ends thereof are firmly attached to the arm 2 by a pair of brackets 13,13. The guide cylinders 8 are provided, in a pair, in parallel between the pipings 12 and the end of the arm 2, and extend on the upper surface of the arm 2 in a direction in which the arm 2 extends and a pair of hoses 6,6 are each passed into the guide cylinders 8. The ends Y on the side of the arm of the hoses 6,6 passing through the guide cylinders 8 are connected to the ends of the pipings 12. A predetermined distance L is maintained between the ends Y of the hoses 6 and the ends of the guide cylinders 8 so as to form a "slackness of hose" that will be described later. Further, urging means 14 are coupled to the portions of the hoses 6 on the side of the ends Y exposed at all times from the guide cylinders 8 to urge the hoses 6 in a direction in which they are pulled out from the guide cylinders 8.

Figure 3:
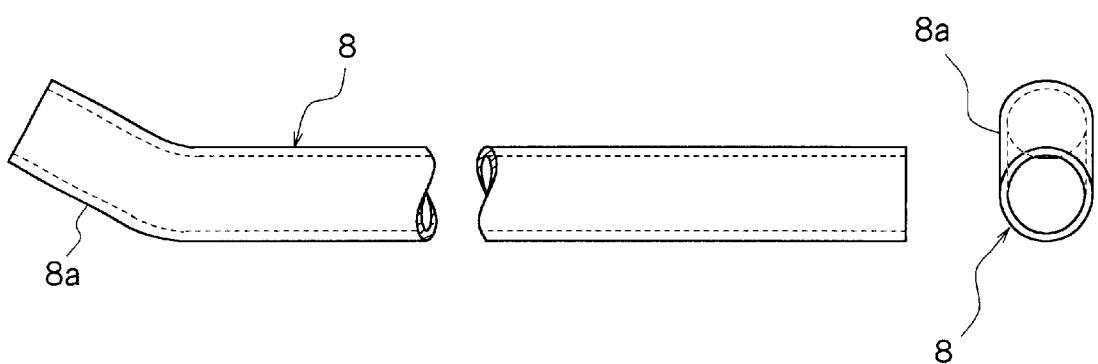
FIG. 3 is a side view and a front view of a guide cylinder on an enlarged scale.

With reference to FIGS. 1 and 2 as well as FIG. 3, the guide cylinders 8 are formed of steel pipes having a circular shape in cross section. The guide cylinders 8 have an inner diameter large enough to permit the passage of the hoses 6 together with the mouth pieces attached to the ends thereof. The guide cylinders 8 are basically formed straight but have ends that are bent at an angle of about 30 degrees on the side of the ends Y of the hoses 6. The guide cylinders 8 are secured to the arm 2 by a suitable means such as welding, and the bending portions 8a are bent upward from the upper surface of the arm 2.

Figure 4:
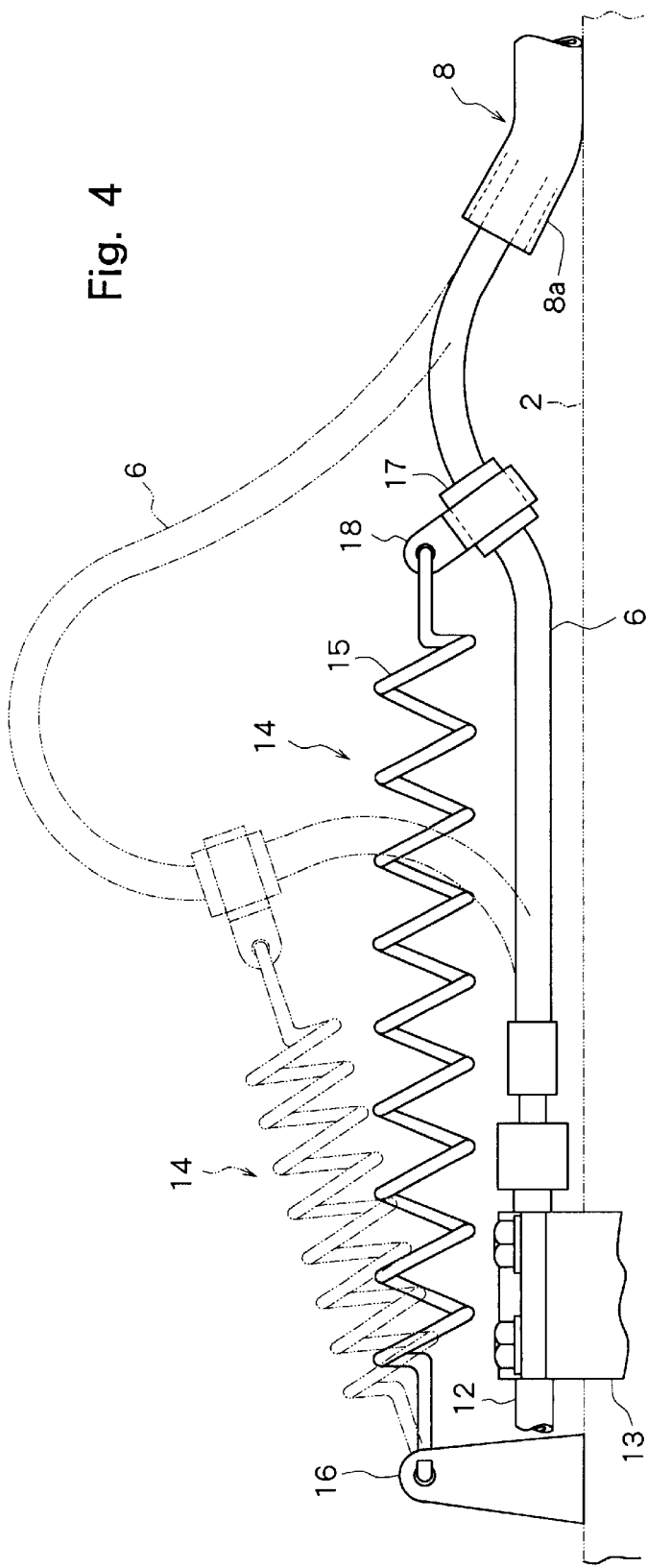
FIG. 4 is an enlarged view of a portion of the urging means shown in FIG. 1.

The urging means 14 will be described with reference to FIGS. 1 and 4. The urging means 14 is provided with a tension coil spring 15. An end of the spring is formed of a plate member and is attached to a bracket 16 secured to the arm 2 by welding. The other end of the spring 15 is attached to a cramp 18 formed of a plate member secured to the outer periphery of the hose 6 via a cylindrical grommet 17 made of rubber. The spring 15 produces a tensile force that always so works as to pull the hoses 6 out from the guide cylinders 8.

The full length of the hose 6 is so defined that a minimum of "slackness of hose" is formed between the end Y and the end of the guide cylinders 8 when the working device 4 swings to the lower position (indicated by a solid line), i.e., when the ends X and Y of the hoses 6 are separated away from each other in a stretched state.

The motion and bending of the hoses 6 in the thus constituted piping structure will now be described with reference chiefly to FIG. 1.

(1) Position where the working device has moved down.

At the position where the working device 4 has moved down (indicated by a solid line), the hoses 6 form a minimum of "slackness of hose" between the ends Y and the guide cylinders 8 as described above.

(2) Position where the working device has moved up.

As the working device 4 swings up from a position where it has moved down (indicated by a solid line) to a position where it has moved up (indicated by a two-dot chain line), the ends X and Y of the hoses 6 are brought close to each other with the motion of the working device 4, and the hoses on the side of the ends X are pushed to enter into the guide cylinders 8 (toward the left in FIG. 1). At this moment, since the hoses 6 are pulled by the urging means 14 in the direction of the ends Y, the hoses on the side of the ends X are easily pulled to enter into the guide cylinders 8 and are pulled out from the bent portions 8a at the other ends of the guide cylinders 8. The portions that are pulled out are directed upward above the arm 2 due to the bent portions 8a, and "slackness" is formed in the hoses 6 between the ends Y and the guide cylinders 8.

(3) As the working device swings down from the upper position, the hoses 6 are pulled toward the side of the ends X so that the ends X and Y separate away from each other, and the "slackened" portions are pulled to enter into the guide cylinders 8.

(4) That is, the hoses 6 inserted in the guide cylinders 8 slides into, or out from, the guide cylinders 8 with the swinging motion of the working device 4, and are bent between the ends Y and the ends of the guide cylinders 8 of the hoses at a predetermined place of the arm 2 to form "slackness". Further, the bending portions 8a of the guide cylinders 8 determine the "direction of slackness" of the hose 6. Therefore, the bending positions of the hoses 6 are defined by the guide cylinders 8.

Action of the above-mentioned piping structure of the working machine will now be described with reference to FIGS. 1 and 2.

(1) Preventing Damage to the Hoses

Flexible hoses 6 coupling the arm 2 to the working device 4 are passed into the guide cylinders 8 provided on the arm 2, so that the hoses can bend at a predetermined bending position and at a position where the hoses 6 will not be damaged by the surrounding obstacles. Therefore, the hoses 6 are not "slackened" at a position where they are likely to be damaged, such as at the end of the arm 2, and hence are not caught between the arm 2 and the working device 4 or do not come in contact with the surrounding obstacles. Therefore, the hoses are prevented from losing the life or from being damaged. Further, the guide cylinders 8 protect the hoses from foreign matters such as sands and soils. Upon bringing the ends on the side of the working device 4 of the guide cylinders 8 as close to the end of the arm 2 as possible, further, the hoses 6 can be more favorably protected from the sands and soils during the working. The urging means 14 which uses the spring 15 is disposed at a place where it is less likely to be damaged and hence, hardly receives damage.

(2) Easy Attachment of Plural Working Devices to the Arm

When plural working devices are attached to the arm 2 on the side surfaces or the like in addition to the end of the arm 2, the guide cylinders can be suitably provided to avoid interference among plural hoses connected to the working devices, facilitating the attachment of plural working devices to the arm 2.

An embodiment of the present invention has been described above in detail. It should, however, be noted that the invention is in no way limited to the above embodiment only but can be varied or modified in a variety of ways without departing from the scope of the invention.

(1) Position for Arranging the Guide Cylinders

In the embodiment of the present invention, the guide cylinders are installed on the arm at a portion where the arm and the working device of the working machine are coupled together. However, the position where the guide cylinders are arranged is not limited to the a place between the arm and the working device or to the arm, but may be at any suitable portion of the hoses which are arranged so as to be flexibly bent on the working machine.

(2) Bending Portions of the Guide Cylinders

In the embodiment of the invention, the bending portions of the guide cylinders are formed at the ends on one side of the guide cylinders, but the ends on the other side are straight. Depending upon the positions of the hoses arranged so as to be flexibly bent or the places where the guide cylinders are installed, however, the bending portions may be provided at the ends on both sides or no bending portion may not be provided at the ends on both sides. The bending angle of the bending portions may be suitably set depending upon the positions for defining the "slackness".

(3) Bending Portions of the Guide Cylinders

Figure 5:
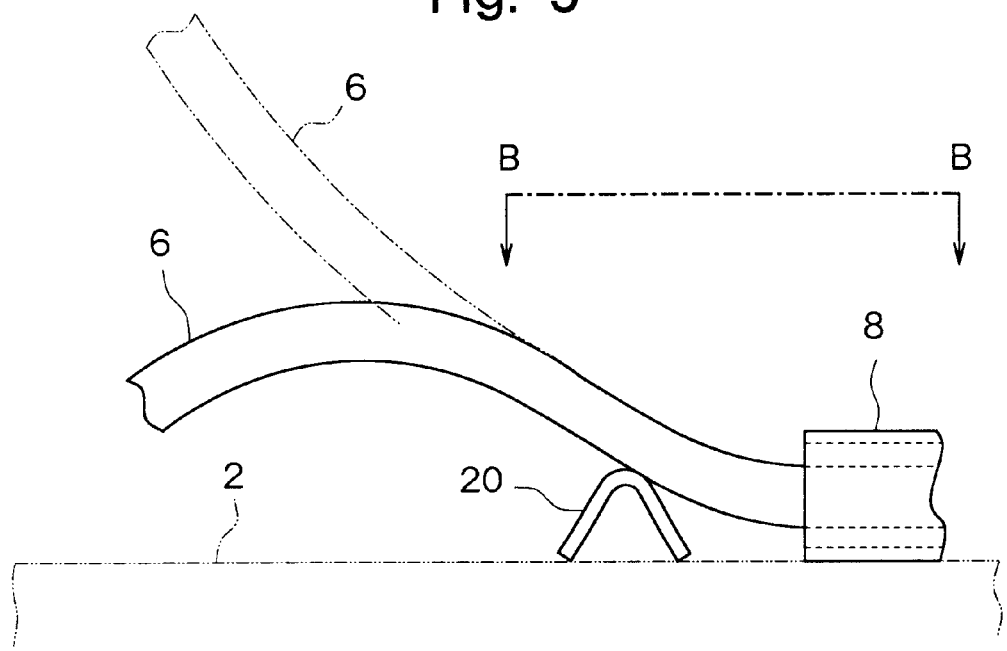
FIG. 5 is a side view of another embodiment for defining the direction of the hoses.
Figure 6:
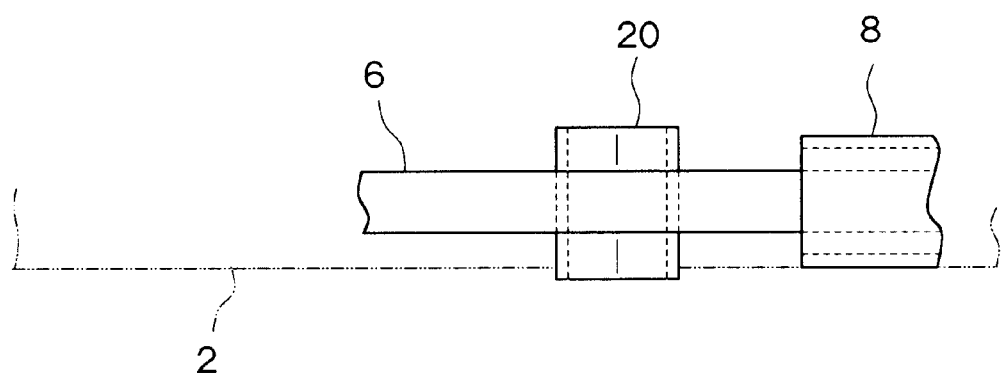
FIG. 6 is a plan view when

Bending portions are formed by the guide cylinders to specify the direction for bending the hoses. As shown in FIGS. 5 and 6, however, a guide member 20 may be provided on the arm 2 near the open ends of the guide cylinders 8 to specify the direction of the hoses 6. The guide member 20 is formed by bending, for example, a plate member, like a mountain in cross section, in such a manner that the smoothly finished bent portion thereof comes into contact with the hoses 6. In this case, the ends of the guide cylinders 8 may be straight without forming bending portions.

(4) Number of the Guide Cylinders

In the embodiment of the present invention, the guide cylinders are provided in a number of two to meet the number of the hoses connected to the hydraulic cylinder of the double-acting type of the working device. The number thereof, however, may be one or three or more depending upon the type and number of the working devices.

(5) Material of the Guide Cylinders

In the embodiment of the present invention, a steel pipe is used for the guide cylinders. Depending upon the working device, however, there may be used an appropriate material such as a non-ferrous metal, e.g., aluminum, a plastic resin or the like. Though a round pipe was used as the guide cylinder, the pipe is not limited to round ones only but may be a square pipe provided it permits the smooth slide of the hose.

(6) Urging Means

In the embodiment of the invention, a tension spring is provided as an urging means to pull the hoses out from the guide cylinders by acting an urging force on the hoses. However, the urging means is not limited to the tension spring but may be a suitable elastic material such as of rubber. Further, the urging means may be so arranged as to push the hoses into the guide cylinders instead of pulling them out.

(7) Urging Means

Figure 7:
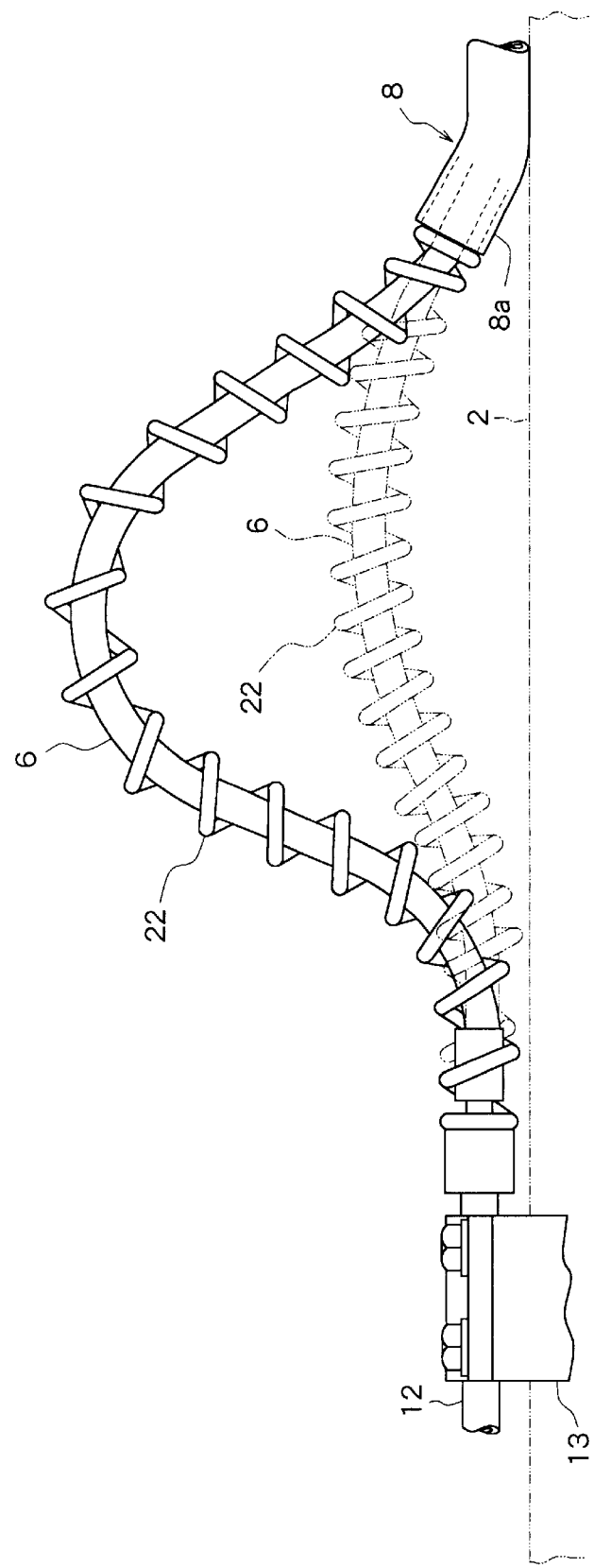
FIG. 7 is a side view illustrating another embodiment of an urging means.
Figure 8:
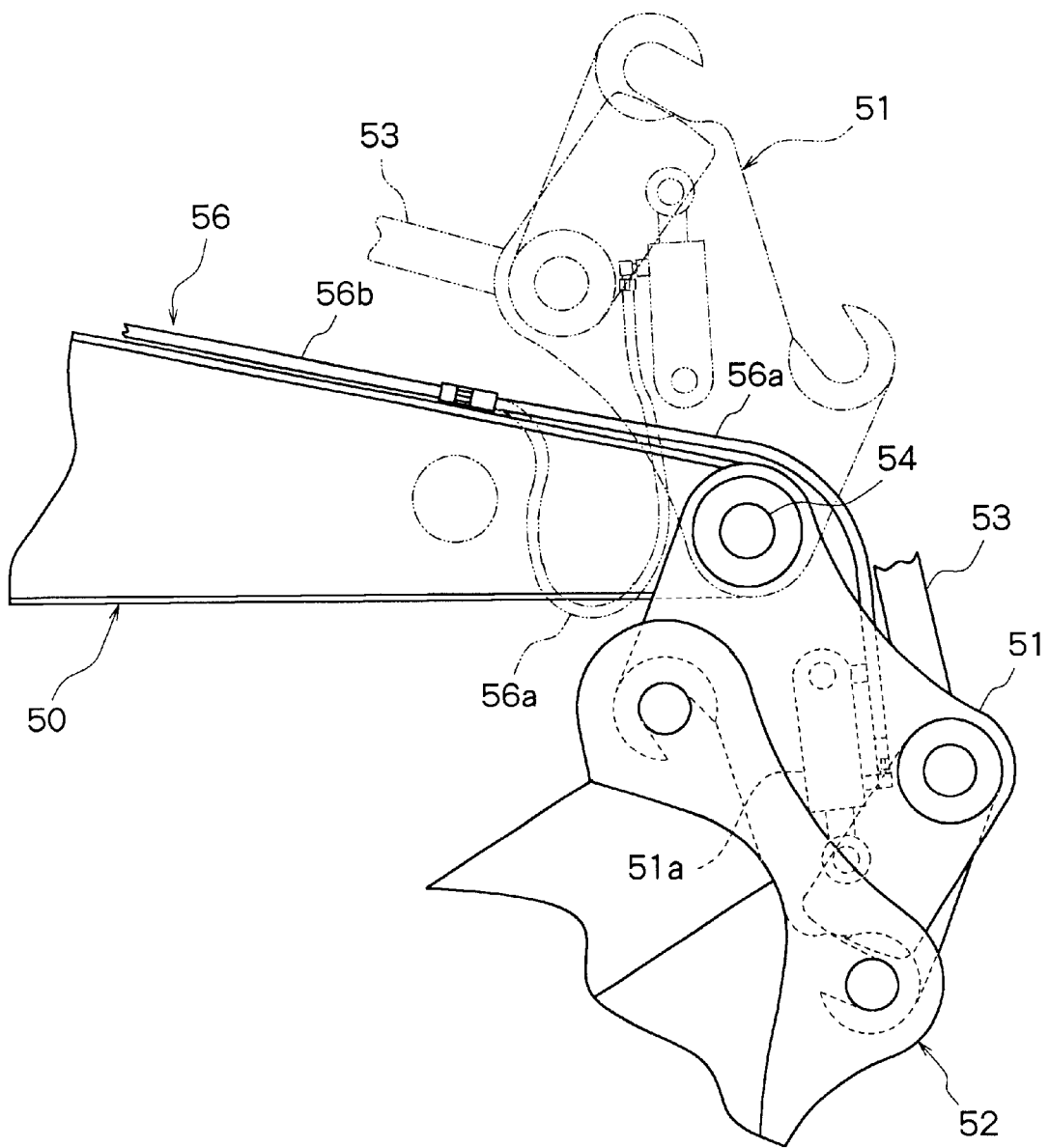
FIG. 8 is a side view illustrating a conventional piping structure of a working machine.

Further, the urging means may be ones of any type provided it urges the hoses toward either a direction to push them into the guide cylinders or a direction to pull them out from the guide cylinders. Therefore, a coil spring 22 in which the hose 6 is inserted as shown in FIG. 7 may be employed instead of the urging means 14 that uses the tension spring 15 shown in FIG. 4. In this case, the coil spring 22 has a free length nearly equal to the length of the hose 6 that is pulled out from the guide cylinder 8 and is bent and exposed, the inner diameter thereof being large enough to permit the passage of the hose 6 together with the mouth piece attached to the end thereof. When the hose 6 is pulled to enter into the guide cylinder 8, the length of the hose 6 of the portion exposed from the guide cylinder 8 becomes short and the coil spring 22 is compressed as indicated by a two-dot chain line. Due to this compressive force, the coil spring 22 works to expand to the initial state indicated by the solid line, and an urging force acts to the hose 6 to pull the hose out from the guide cylinder 8. The coil spring 22 works as the urging means and further works as a protecting member for protecting the hose from coming into collision or contact with foreign matter.

According to the piping structure of the working machine constituted according to the present invention, there is provided a piping structure of the working machine, which can prevent the hose that is so arranged as can be flexibly bent on the working machine, from being damaged.

What is claimed is:

1. A hydraulic shovel comprising a piping structure, wherein the piping structure comprises at least one flexible hose and a guide cylinder, wherein an intermediate portion of said at least one flexible hose is slidably insertable into said guide cylinder, and an urging means for urging said hose toward either a direction to move into said guide cylinder or a direction to move out from said guide cylinder so as to form slaking of said hose at a predetermined place.

2. A hydraulic shovel according to claim 1, wherein said guide cylinder has, at the end on one side or at ends on both sides thereof, a bending portion for defining the direction of said hose that moves in or out.

3. A hydraulic shovel according to claim 1, wherein said urging means is provided with a tension spring coupled to said hose.

4. A hydraulic shovel according to claim 1, wherein said urging means is provided with a coil spring in which said hose is inserted.

5. A hydraulic shovel according to claim 1, wherein said guide cylinder is formed of a steel pipe.

6. A hydraulic shovel according to claim 1, wherein said urging means is an elastic material.

7. A hydraulic shovel according to claim 1, wherein said urging means comprises a rubber.

8. A piping structure of a working machine comprising at least one flexible hose and a guide cylinder, wherein an intermediate portion of said at least one flexible hose is slidably insertable into said guide cylinder, and an urging means for urging said hose toward either a direction to move into said guide cylinder or a direction to move out from said guide cylinder so as to form slaking of said hose at a predetermined place, wherein a plate member is provided near the open end of said guide cylinder to define the direction of said hose that moves in or out.

9. A hydraulic shovel according to claim 1, further comprising a cylindrical member provided near the open end of said guide cylinder to define the direction of said hose that moves in or out.

10. A piping structure of a working machine comprising at least one flexible hose and a guide cylinder, wherein an intermediate portion of said at least one flexible hose is slidably insertable into said guide cylinder, and an urging means far urging said hose toward either a direction to move into said guide cylinder or a direction to move out from said guide cylinder so as to form slaking of said hose at a predetermined place, wherein said working machine includes an arm and a working device swingably coupled to an end of said arm, said guide cylinder being provided on said arm, and said hose is passed into said guide cylinder.

11. A piping structure according to claim 10, further comprising a shaft member attached to an end of the arm.

* * * * *

UNITED STATES PATENT AND TRADEMARK OFFICE
CERTIFICATE OF CORRECTION

PATENT NO. : 6,601,877 B2
DATED : August 5, 2003
INVENTOR(S) : Hiroyasu Nishikawa et al.

It is certified that error appears in the above-identified patent and that said Letters Patent is hereby corrected as shown below:

Column 7,
Line 5, reads "means far" should read -- means for --

Signed and Sealed this

Twenty-ninth Day of June, 2004

JON W. DUDAS
*Acting Director of the United States Patent and Trademark Office*